US010178419B2

(12) United States Patent
Li

(10) Patent No.: US 10,178,419 B2
(45) Date of Patent: Jan. 8, 2019

(54) NETWORK-BASED VIDEO TYPE IDENTIFICATION METHOD, CLIENT AND SERVER

(71) Applicant: Beijing Pico Technology Co., Ltd., Beijing (CN)

(72) Inventor: Ligang Li, Beijing (CN)

(73) Assignee: BEIJING PICO TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/252,408

(22) Filed: Aug. 31, 2016

(65) Prior Publication Data
US 2017/0127094 A1    May 4, 2017

(30) Foreign Application Priority Data

Oct. 28, 2015  (CN) .......................... 2015 1 0714003

(51) Int. Cl.
| | |
|---|---|
| *H04N 7/16* | (2011.01) |
| *H04N 21/239* | (2011.01) |
| *G06F 17/30* | (2006.01) |
| *H04N 21/231* | (2011.01) |
| *H04N 21/24* | (2011.01) |
| *H04N 21/278* | (2011.01) |

(52) U.S. Cl.
CPC ... *H04N 21/2393* (2013.01); *G06F 17/30038* (2013.01); *H04N 21/23113* (2013.01); *H04N 21/2407* (2013.01); *H04N 21/278* (2013.01)

(58) Field of Classification Search
CPC ......... H04N 21/2547; H04N 21/44209; H04N 21/4755; H04N 21/4532

USPC ........................ 725/14, 36, 37, 39, 146, 151
See application file for complete search history.

(56) References Cited

U.S. PATENT DOCUMENTS

| | | | | |
|---|---|---|---|---|
| 2010/0289871 | A1* | 11/2010 | Tatsuta | H04N 13/0059 348/42 |
| 2011/0010739 | A1* | 1/2011 | Yun | H04N 13/0048 725/39 |
| 2012/0033935 | A1* | 2/2012 | Kabuto | H04N 5/775 386/230 |

(Continued)

OTHER PUBLICATIONS

"The Equivalency of Software and Hardware," Theory of Computer Constitution, Ed. Bai Zhongying, Oct. 1997, pp. 218-219, and 239.

*Primary Examiner* — Jivka A Rabovianski
(74) *Attorney, Agent, or Firm* — Venable LLP; Michele V. Frank

(57) ABSTRACT

The present invention discloses a network-based video type identification method and system, a client, a server and an electronic device. In the present invention, a client generates a video identification code for a local video, and sends a request querying about a type of the video to a server; the server queries about a video type in a database based on the video identification code and returns a query result; the client sets the video type based on the query result; the client judges whether playing of the video reaches a predetermined duration; if the predetermined duration is reached, the client sends a video type report carrying the video identification code to the server; and the server updates the video type in the database based on the video type report. This invention provides a network-based video type identification technique with high identification accuracy.

8 Claims, 3 Drawing Sheets

(56) References Cited

U.S. PATENT DOCUMENTS

2013/0044192 A1* 2/2013 Mukherjee ......... H04N 13/0029
                                                      348/51

* cited by examiner

NETWORK-BASED VIDEO TYPE IDENTIFICATION METHOD, CLIENT AND SERVER

FIELD OF THE INVENTION

The present invention relates to video type identification, and particularly to a network-based video type identification method, a network-based video type identification system, a network-based video type identification method executed by a client, a network-based video type identification method executed by a server, a client, a server and an electronic device.

BACKGROUND OF THE INVENTION

In recent years, as video technologies develop, there are more and more video types, such as 2D videos, 3D videos and panoramic videos. With application of virtual reality devices, users can experience super large screen effect at home similar to that produced by a movie theatre, and panoramic videos even bring an immersed experience. Videos of different types need corresponding processing when being played. For example, playing 3D videos requires separate images for the left and right eyes and proportion adjustment; playing panoramic videos requires playing in 360 degrees. However, when devices play local 2D videos, 3D videos and panoramic videos, users do not know the video type, and can only select a type by themselves, which is inconvenient. Although some playing clients provide automatic identification functions for video types, there is a problem of inaccurate identification.

SUMMARY OF THE INVENTION

An objective of the present invention is to provide novel technical solutions for network-based video type identification.

According to a first aspect of the present invention, there is provided a client, comprising: a video identification code generating unit configured to generate a video identification code for a local video; a query request sending unit configured to send a request querying about a type of the video to a server, the request carrying a video identification code of the video; a video type setting unit configured to: receive a video type query result carrying the video identification code sent by the server, set a type for the video if the video type query result shows that the type of the video is unknown, and set the type of the video according to a queried type if the video type query result is a video type; a video playing unit configured to play the video according to the video type; and a video type report sending unit configured to judge whether playing of the video reaches a predetermined duration, and send a video type report carrying the video identification code to the server if the playing of the video reaches the predetermined duration.

Preferably, the video type setting unit is further configured to set the type of the video to another type if the playing of the video fails to reach the predetermined duration.

Preferably, the video type setting unit is further configured to set the type of the video according to a video type setting command from a user.

Preferably, the predetermined duration is set based on a proportion of a time length of the video, or the predetermined duration is an absolute duration.

Preferably, the video identification code is generated based on at least one of the following video elements: a video size, a video duration, a video encoding format, a video encoding bit rate, video generation time, a video author, a video generation tool, data at a specific position of the video and data at a specific position of a decoded video.

Preferably, the video identification code is generated by combining transformations of multiple video elements, or by transforming a combination of multiple video elements, or by just combining the multiple video elements.

Preferably, the video identification code is generated by combining hash values of multiple video elements, or by calculating a hash value of a combination of the multiple video elements.

According to a second aspect of the present invention, there is provided an electronic device comprising the above client.

According to a third aspect of the present invention, there is provided a server, comprising: a database configured to store types of videos and identification codes of the videos; a video type querying unit configured to: receive a request querying about a type of a video sent by a client, the request carrying the video identification code of the video, query about a type of the video in the database based on the video identification code, and send a video type query result carrying the video identification code to the client; and a video type setting unit configured to: receive a video type report carrying the video identification code sent by the client, and update the type of the video in the database based on the video type report.

Preferably, the video type setting unit updates the type of the video in the database based on the video type report by: if the database does not include the type of the video, setting the type of the video in the database based on a type in the video type report; and if the database includes the type of the video which is different from the type in the video type report, recording the type in the video type report as a new type and recording the number of times of reporting the new type; if the number of times reaches a threshold value, setting the type of the video in the database as the new type.

According to a fourth aspect of the present invention, there is provided a network-based video type identification system comprising the above client and the above server.

According to a fifth aspect of the present invention, there is provided a network-based video type identification method executed by a client, comprising the steps of: generating a video identification code for a local video; sending a request querying about a type of the video to a server, the request carrying the video identification code of the video; receiving a video type query result carrying the video identification code sent by the server; if the video type query result shows that the type of the video is unknown, setting a type for the video; if the video type query result is a video type, setting the type of the video according to a queried type; playing the video according to the video type, and judging whether playing of the video reaches a predetermined duration; if the playing of the video reaches the predetermined duration, sending a video type report carrying the video identification code to the server.

According to a sixth aspect of the present invention, there is provided a network-based video type identification method executed by a sever, comprising the steps of: receiving a request querying about a type of a video sent by a client, the request carrying a video identification code of the video; querying about the type of the video in a database based on the video identification code, and sending a video type query result carrying the video identification code to the client; receiving a video type report carrying the video identification code sent by the client, and updating the video type in the database based on the video type report.

According to a seventh aspect of the present invention, there is provided a network-based video type identification method, comprising the steps of: generating by a client a video identification code for a local video; sending by the client a request querying about a type of the video to a server, the request carrying the video identification code of the video; receiving by the server the request querying about the type of the video sent by the client, querying by the server about the type of the video in a database based on the video identification code, and sending by the server a video type query result carrying the video identification code to the client; receiving by the client the video type query result carrying the video identification code sent by the server; if the video type query result shows that the type of the video is unknown, setting by the client a type for the video; if the video type query result is a video type, setting by the client the type of the video according to a queried type; playing by the client the video according to the video type, and judging by the client whether playing of the video reaches a predetermined duration; if the playing of the video reaches the predetermined duration, sending by the client a video type report carrying the video identification code to the server; receiving by the server the video type report carrying the video identification code sent by the client, and updating by the server the video type in the database based on the video type report.

This invention provides a network-based video type identification method with high identification accuracy, which can reduce or prevent manual adjustment of a video type by a user. The inventor(s) of the present invention find(s) that there is no network-based video type identification technology in the prior arts. Therefore, the technical problem to be solved by the present invention is not anticipated by those skilled in the art, and the present invention includes novel technical solutions.

Other features and advantages of the present invention will become apparent through the detailed descriptions of the embodiments of this invention with reference to the drawings.

BRIEF DESCRIPTION OF THE DRAWINGS

The drawings that are integrated into the description and constitute a part of the description show the embodiments of the present invention and are intended to explain the principle of the invention together with the descriptions thereof.

DETAILED DESCRIPTION OF THE EMBODIMENTS

Now, various embodiments of this invention will be described in detail with reference to the drawings. It should be noted that, unless specified otherwise, the arrangements of the members and steps, the mathematical formulas and numerical values described in these embodiments do not restrict the scope of the invention.

The following descriptions for at least one embodiment are actually descriptive only, and shall not be intended to limit the invention and any application or use thereof.

The techniques, methods and devices well known to those skilled in the related arts may not be discussed in detail. However, where applicable, such techniques, methods and devices should be deemed as a part of the description.

Any specific value shown herein and in all the examples should be interpreted as illustrative only rather than restrictive. Therefore, other examples of the embodiments may include different values.

It should be noted that similar signs and letters in the following drawings represent similar items. Therefore, once defined in one drawing, an item may not be further discussed in the followed drawings.

Figure 1:
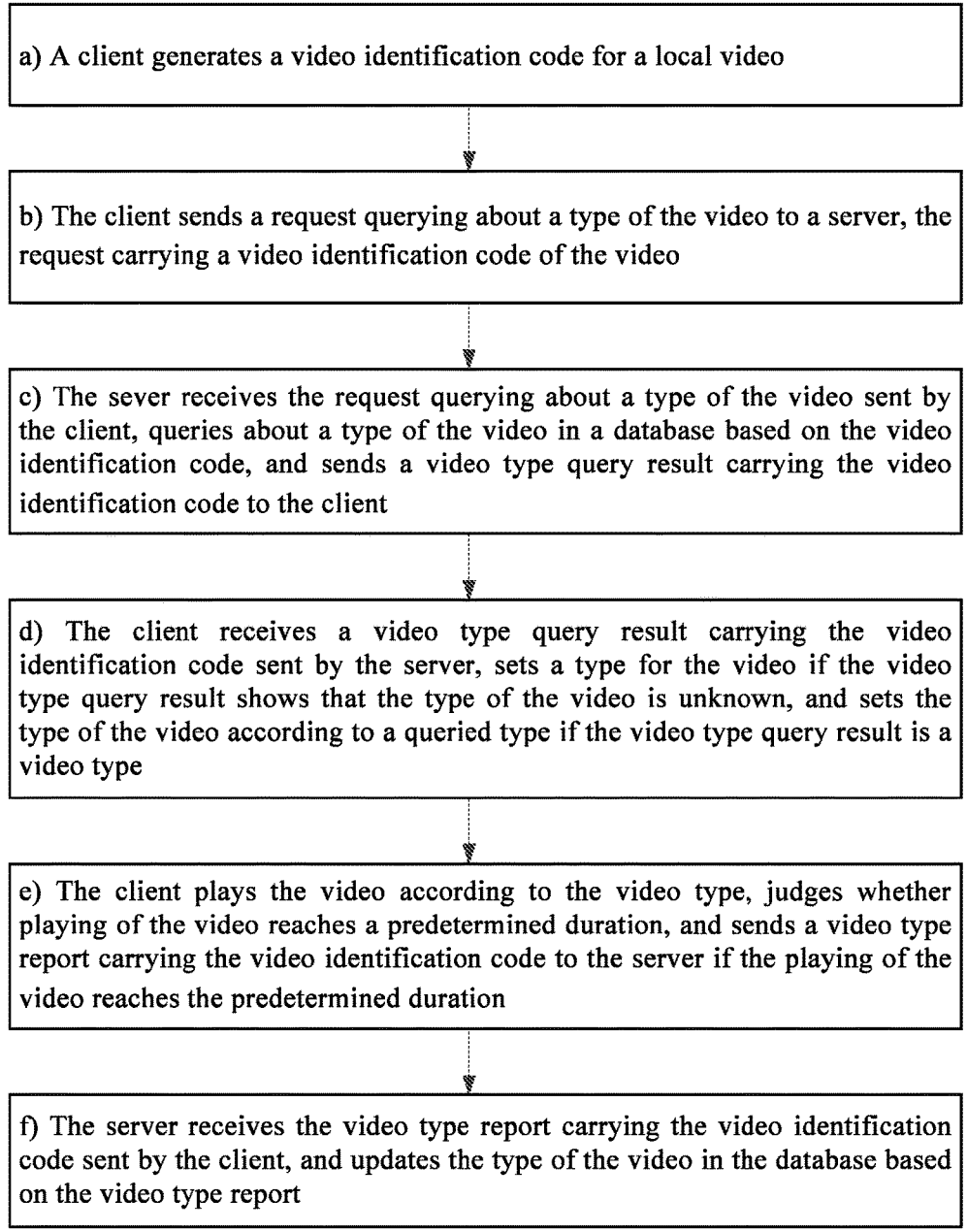
FIG. 1 is a schematic view showing a flowchart of a network-based video type identification method.

FIG. 1 shows a network-based video type identification method of this invention. The method comprises the followings steps.

a) A client generates a video identification code for a local video. The video identification code is unique for each video. Different videos have different video identification codes, through which the videos can be identified by clients and servers.

The video identification code may be generated based on at least one of the following video elements of a video file:
a video file size;
metadata information of the video file, wherein the metadata refers to information describing attributes of the video, such as a video duration, a video encoding format, a video encoding bit rate, video generation time, a video author, and a video generation tool;
a part or all of the data of the video file, such as a segment of data of a fixed length at a fixed offset position, or multiple segments of data at specific positions;
data at a specific position of a decoded video, such as images, audios and subtitles at a specific position of the decoded video.

Video elements may be a part of the video identification code. For example, the video identification code may be generated by directly combining multiple video elements, or by combining a transformation of the multiple video elements. For example, the video identification code may be generated by combining hash values of the multiple video elements. Optionally, the video identification code may be generated by transforming a combination of the multiple video elements, or by calculating a hash value of a combination of the multiple video elements.

b) The client sends a request querying about a type of the video to a server, the request carrying a video identification code of the video.

c) The sever receives the request querying about a type of the video sent by the client, queries about a type of the video in a database based on the video identification code, and sends a video type query result carrying the video identification code to the client. In this step, if the database includes type information of the video, a queried result will be the type of the video; if the database does not include type information of the video, the queried result shows that the type of the video is unknown.

d) The client receives a video type query result carrying the video identification code sent by the server. The client sets a type for the video if the video type query result shows that the type of the video is unknown. For example, the client may set a default type or a random type for the video, or set a type for the video after calculating the same using a self-adaptive algorithm. The client sets the type of the video according to a queried type if the video type query result is a video type. The client may locally store the video type, so that users can use when playing the video afterwards. The client may not locally store the video type, but sends a request querying about a type of the video to a server each time before playing the video. The client also supports video types manually set by users.

e) The client plays the video according to the video type, and judges whether playing of the video reaches a predetermined duration. The client deems that the video type used for the playing is correct if the playing of the video reaches the predetermined duration, and sends a video type report carrying the video identification code to the server. That is, the client sends both the video identification code and the video type used for the playing to the server. The predetermined duration may be set based on a proportion of a time length of the video, or may be an absolute duration.

The video type may be set manually by a user or automatically by the client to another type if the playing of the video fails to reach the predetermined duration. The type of a video may be set for several times. Once a video of a set type is played for the predetermined duration and the client deems that the video type used for the playing is correct, the client sends a video type report carrying the video identification code to the server.

In this step, the client may locally store the video type which is deemed to be correct by the client.

f) The server receives the video type report carrying the video identification code sent by the client, and updates the type of the video in the database based on the video type report. This step may include the following cases:

if the database does not include type information of the video, the type of the video is set in the database based on a type in the video type report;

if the database includes the type of the video which is the same as that in the video type report, the number of times of record for the type is updated in the database;

if the database includes the type information of the video which is different from the type in the video type report, the type in the video type report is recorded as a new type and the number of times of reporting the new type is recorded; if the number of times reaches a threshold value, the type of the video is set as the new type in the database. The threshold value may be a set value, or a time record of the original type. The main purpose of this step is to reduce unfavorable influence of incorrect determination.

For a video whose type is changed for multiple times, the server may send out a reminder so that manual determination may be performed at the server.

Figure 2:
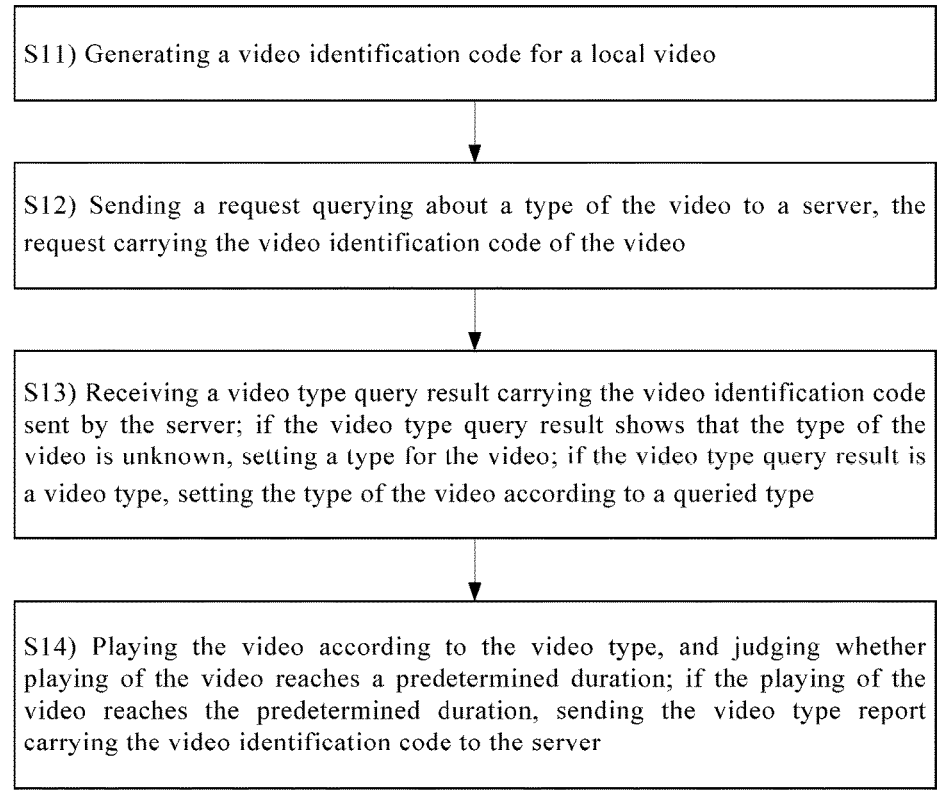
FIG. 2 is a flowchart of a network-based video type identification method executed by a client.

FIG. 2 shows a network-based video type identification method executed by a client shown by the embodiment in FIG. 1. The method comprises the steps of:

S11) generating a video identification code for a local video;

S12) sending a request querying about a type of the video to a server, the request carrying the video identification code of the video;

S13) receiving a video type query result carrying the video identification code sent by the server; if the video type query result shows that the type of the video is unknown, setting a type for the video; if the video type query result is a video type, setting the type of the video according to a queried type;

S14) playing the video according to the video type, and judging whether playing of the video reaches a predetermined duration; if the playing of the video reaches the predetermined duration, sending the video type report carrying the video identification code to the server.

Figure 3:
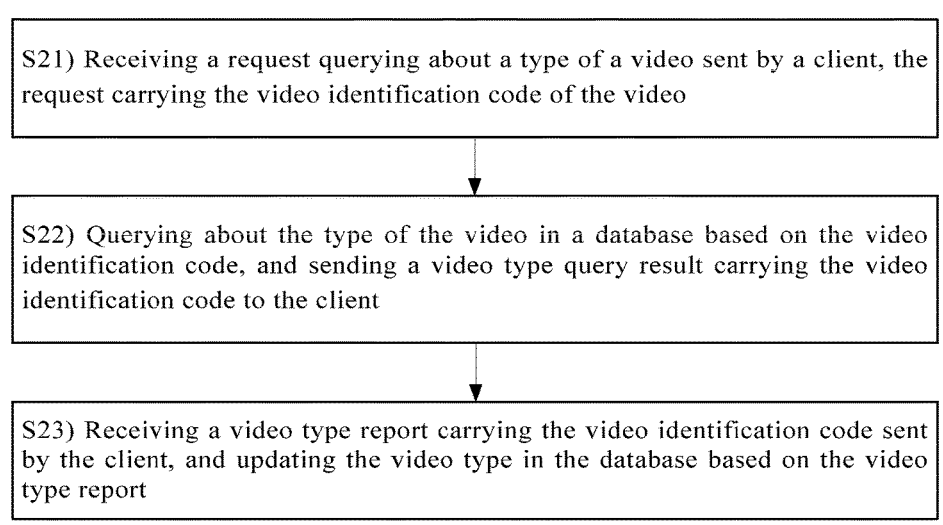
FIG. 3 is a flowchart of a network-based video type identification method executed by a server.

FIG. 3 shows a network-based video type identification method executed by a server shown by the embodiment in FIG. 1. The method comprises the steps of:

S21) receiving a request querying about a type of a video sent by a client, the request carrying a video identification code of the video;

S22) querying about the type of the video in a database based on the video identification code, and sending a video type query result carrying the video identification code to the client;

S23) receiving a video type report carrying the video identification code sent by the client, and updating the video type in the database based on the video type report.

Figure 4:
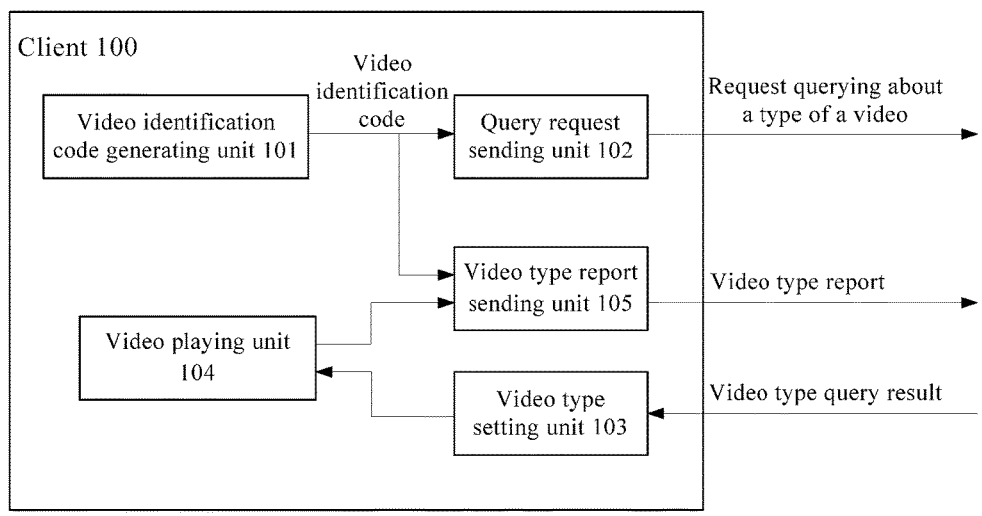
FIG. 4 shows a block view of a client.

FIG. 4 shows a client 100 in the embodiment shown in FIG. 1. The client 100 comprises:

a video identification code generating unit 101 configured to generate a video identification code for a local video;

a query request sending unit 102 configured to send a request querying about a type of the video to a server 200, the request carrying a video identification code of the video;

a video type setting unit 103 configured to: receive a video type query result carrying the video identification code sent by the server 200, set a type for the video if the video type query result shows that the type of the video is unknown, and set the type of the video according to a queried type if the video type query result is a video type;

a video playing unit 104 configured to play the video according to the video type; and a video type report sending unit 105 configured to judge whether playing of the video reaches a predetermined duration, and send a video type report carrying the video identification code to the server 200 if the playing of the video reaches the predetermined duration.

The video type setting unit 103 is further configured to set the type of the video to another type if the playing of the video fails to reach the predetermined duration. The video type setting unit 103 is further configured to set the type of the video according to a video type setting command from a user.

The predetermined duration is set based on a proportion of a time length of the video, or the predetermined duration is an absolute duration.

The video identification code is generated based on at least one of the following video elements: a video size, a video duration, a video encoding format, a video encoding bit rate, video generation time, a video author, a video generation tool, data at a specific position of the video and data at a specific position of a decoded video.

The video identification code is generated by combining transformations of multiple video elements, or by transforming a combination of the multiple video elements, or by just combining the multiple video elements.

The video identification code is generated by combining hash values of multiple video elements, or by calculating a hash value of a combination of the multiple video elements.

Figure 5:
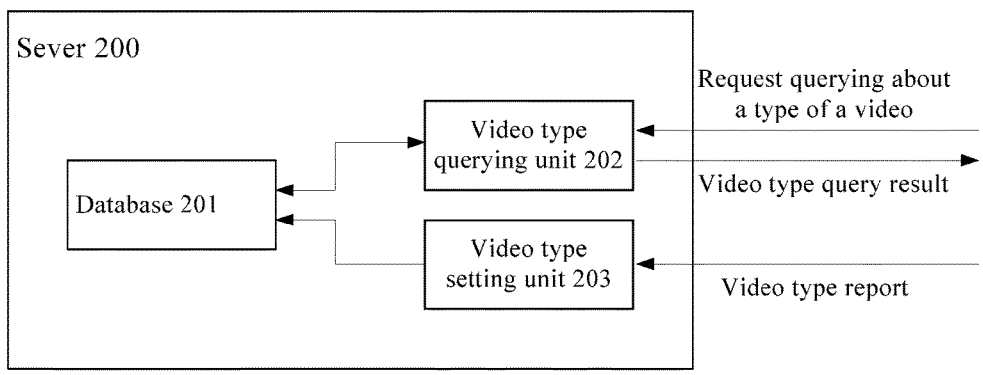
FIG. 5 shows a block view of a server.

FIG. 5 shows a server 200 in the embodiment shown in FIG. 1. The server 200 comprises:

a database 201 configured to store a type of a video and an identification code of the video;

a video type querying unit 202 configured to: receive a request querying about a type of the video sent by a client 100, the request carrying the video identification code of the video, query about the type of the video in the database 201 based on the video identification code, and send a video type query result carrying the video identification code to the client 100; and a video type setting unit 203 configured to: receive a video type report carrying the video identification code sent by the client 100, and update the type of the video in the database 201 based on the video type report.

That the video type setting unit 203 updates the type of the video in the database based on the video type report comprises: if the database does not include the type of the video, setting the type of the video in the database based on a type in the video type report; and if the database includes the type of the video which is different from the type in the video type report, recording the type in the video type report as a new type and recording the number of times of reporting the new type; if the number of times reaches a threshold value, setting the type of the video as the new type in the database.

This invention also provides an electronic device comprising the above client, such as a cell phone, a playing device, a computer, a PAD and so on. This invention also provides a network-based video type identification system comprising the above client and the above server.

The respective methods, systems, clients and servers of this invention may be computer program products. The respective methods, systems, clients and servers of this invention may be realized by hardware or software or a combination thereof.

The network-based video type identification method of this invention has achieved the effect of "labeling by one, benefiting for all". Through participation of a part of the users, video type identification accuracy is ensured, and most users do not need to manually switch the types of videos, thereby obtaining better user experience.

Using the technical solution of this invention, the user who is the first one viewing a video may need to manually select a video type, but following users can directly enjoy the selection result made by the first user. As users judge the video types, accuracy of the judging result can be ensured. If some user wrongly sets a video type for some reasons, the server has a mechanism to control unfavorable influence within certain range, so that most users will not be affected.

This invention may be realized through systems, methods and/or computer program products. The computer program products may comprise computer-readable storage media storing computer-readable programs and instructions for causing processors to realize the respective aspects of this invention. The respective aspects of this invention have been described with reference to the flowcharts and block views of the embodiments of this invention. It should be understood that each block or a combination of the blocks in the flowcharts and block views may be realized by computer-readable programs and instructions.

The flowcharts and block views in the accompanying drawings show the structures, functions and operations that may be realized by the systems, methods and computer program products of this invention. Each block in the flowcharts and block views may represent one module, one program segment or a part of instructions, which comprise(s) one or more executable instructions for realizing predetermined logical functions. It should be noted that each block or a combination of the blocks in the flowcharts and/or block views may be realized by specific software systems for executing predetermined functions or operations, or by a combination of specific hardware and computer instructions. Those skilled in the art should well know that the realization manners by hardware, or software or a combination thereof are all equivalents.

The above has described the embodiments of this invention. But the above descriptions are only exemplary rather than exhaustive, and are not intended to limit the disclosed embodiments. Those skilled in the art should clearly understand that modifications and alternatives can easily be made to the above embodiments without departing from the scope and spirit of the embodiments of this invention. The terms selected in this disclosure are intended to best explain the principles of the embodiments, actual applications or improvements to the existing technologies, or to enable those skilled in the art/related arts to better understand the embodiments of this invention. The scope of this invention is defined by the appended claims.

What is claimed is:

1. A client, installed on an electronic device, characterized by comprising:
memory having instructions stored thereon; and
a processor coupled to the memory, where the instructions are executed by the processor to:
generate a video identification code for a local video;
send a request querying about a video type of the video to a server, the request carrying the video identification code, through which the video can be identified by the client and the server, of the video;
receive a video type query result carrying the video identification code sent by the server, set a video type for the video at the client if the video type query result shows that the video type of the video is unknown, and set the video type of the video according to a queried video type contained in the video type query result if the video type query result contains the queried video type;
play the video according to the video type; and
judge whether playing of the video reaches a predetermined duration time, and send a video type report carrying the video identification code and the video type for the played video to the server if the playing of the video reaches the predetermined duration time; and
re-set the video type of the video to another video type if the playing of the video fails to reach the predetermined duration time.

2. The client of claim 1, characterized in that, the instructions are executed by the processor to set the video type of the video according to a video type setting command from a user.

3. The client of claim 1, characterized in that, the instructions are executed by the processor to set the predetermined duration time to be a proportion of a time length of the video, or the predetermined duration time is an absolute duration time.

4. The client of claim 1, characterized in that, the instructions are executed by the processor to generate the video identification code based on at least one of the following video elements: a video size, a video duration time, a video encoding format, a video encoding bit rate, video generation time, a video author, a video generation tool, data at a specific position of the video and data at a specific position of a decoded video.

5. The client of claim 1, characterized in that, the instructions are executed by the processor to generate the video identification code by combining transformations of multiple video elements, or by transforming a combination of multiple video elements, or by just combining the multiple video elements.

6. The client of claim 1, characterized in that, the instructions are executed by the processor to generate the video identification code by combining hash values of multiple video elements, or by calculating a hash value of a combination of the multiple video elements.

7. A server, characterized by comprising:
a database configured to store video types of videos and identification codes of the videos;
memory having instructions stored thereon; and
a processor coupled to the memory, where the instructions are executed by the processor to:
   receive a request querying about a video type of a video sent by a client, the request carrying the video identification code, through which the video can be identified by the client and the server, of the video, query about a video type of the video in the database based on the video identification code, and send a video type query result carrying the video identification code and the queried video type to the client; and
   receive a video type report carrying the video identification code and a video type sent by the client, and update the video type of the video in the database based on the video type carried in the video type report; and
   update the video type of the video in the database based on the video type report by:
   if the database does not include the video type of the video, setting the video type of the video in the database based on a video type in the video type report; and
   if the database includes the video type of the video which is different from the video type in the video type report, recording the video type in the video type report as a new video type and recording the number of times of reporting the new video type; if the number of times reaches a threshold value, setting the video type of the video in the database as the new video type.

8. A network-based video type identification method, characterized by comprising the steps of:
generating by a client a video identification code for a local video;
sending by the client a request querying about a video type of the video to a server, the request carrying the video identification code, through which the video can be identified by the client and the server, of the video;
receiving by the server the request querying about a video type of a video sent by a client, the request carrying the video identification code of the video;
receiving by the client a video type query result carrying the video identification code sent by the server; if the video type query result shows that the video type of the video is unknown, setting a video type for the video at the client; if the video type query result contains a queried video type, setting the video type of the video according to the queried video type;
playing by the client the video according to the video type, and judging whether playing of the video reaches a predetermined duration time; if the playing of the video reaches the predetermined duration time, sending a video type report carrying the video identification code and the video type for the played video to the server;
and if the playing of the video fails to reach the predetermined duration time, re-setting the video type of the video to another video type;
receiving by the server the video type report carrying the video identification code and the video type for the played video sent by the client, and updating the video type in the database based on the video type report.

* * * * *